3996X
D. Pool,
Cracker Machine,
Patented Dec. 24, 1824.
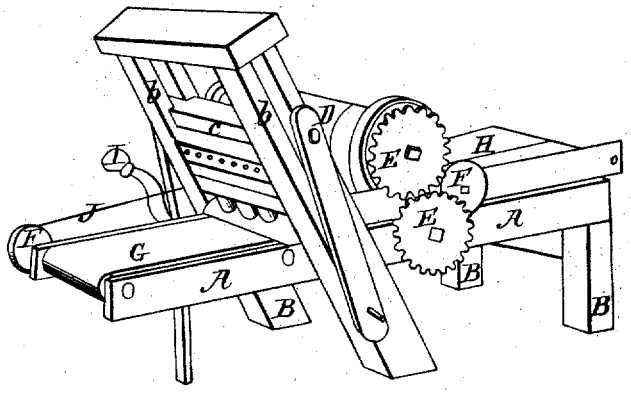
N. PETERS, PHOTO-LITHOGRAPHER, WASHINGTON, D. C.

Dec. 24, 1844

Daniel Poole 3996X

The schedule referred to in these Letters Patent
and making part of the same containing a descrip-
tion in the words of the said Daniel Poole himself
of his improvement in the machine for rolling and
cutting crackers

---

The first consists of a frame standing on four posts, the
frame may be about six feet long, and the width agree-
able to the number of cutters should be put in the
machine, the height from three to four feet, the
posts at one end of the machine which is called the
head, extend up from two to three feet above the sides
of said frame, where the slide works, in that the cutters
are attached to, these posts are on a pitch of about fif-
teen degrees, There are two rollers hung in two short
posts back of the other head posts, one roller above the
other which roll the dough, this dough is brought on
by an apron, this apron gets its motion by means of two small roll=
ers one of them let into the sides close to the rollers that
roll the dough, and the other at the back end, this ap-
ron is about four feet long and receives its motion
from the rollers that roll the dough by means of bands
and small pulleys, the dough passes through the roll-
ers on a platform of lead where the cutters cut the
crackers, this platform of lead is level with the
lower roller that rolls the dough, there is another
apron that takes the crackers from this platform
which is about three feet long and is carried by
rollers, the same as the other apron and gets its mo-
tion from the rollers that roll the dough in the same
way as the other apron, the cutters are put on a
plate

3996X plate in a slide similar to a saw gate which works up
and down in their posts at the head, the cutters get
their motion from a shaft which passes thro' under the
platform with the cranks at each end & pitman to con-
nect the crank and slide together, the rollers get their
motion from this pitman by having two pulleys put on
at each end of the upper roller that rolls the dough
with cogs on them and bands round them, which
work loose and a catch in one side of the bands which
catch in these cogs, there is a handle in one side of these
bands which runs out to the pitman and is connected to
them and when the cutters raise it gives motion to
the rollers and when the cutters go down the rollers
stand still; these cutters may be put on brass or any
other metalic substance in one two or three rows to=
gether in any number from one to fifty or more.
the prickers for these cutters are screwed in through the
plate any number may be put in, there are small
plates put in for clearers and get their motion by hav-
ing two small wires rivetted in each side of the plate
and passes thro' the plate that the cutters are placed into
[illegible] which fixed in by means of small binders, this
[illegible] each end when the cutters go down ju[illegible]
[illegible] in to cut and draw the clearers up in
the cutters, and when the cutters raise, the clearers
[illegible] out by means of a spring and clear the cracker
out; the name is put in the centre of the cutter and
pass up through the plate, & small burrs on the up-
per side, this name has no motion but is put in per-
manent.

Witnesses
John C. Hinman
William Milnor

Daniel Poole

Drawing

660 [illegible]